United States Patent [19]

Koohgoli et al.

[11] Patent Number: 5,276,908
[45] Date of Patent: Jan. 4, 1994

[54] CALL SET-UP AND SPECTRUM SHARING IN RADIO COMMUNICATION ON SYSTEMS WITH DYNAMIC CHANNEL ALLOCATION

[75] Inventors: Mahshad Koohgoli; Sorin Cohn-Sfetcu, both of Ottawa, Canada; John D. Lockton, Hillsborough, Calif.

[73] Assignees: Northern Telecom Limited; BCE Telecom International, Inc., Montreal, Canada

[21] Appl. No.: 603,233

[22] Filed: Oct. 25, 1990

[51] Int. Cl.⁵ .......................... H04Q 7/00; H04Q 9/00
[52] U.S. Cl. .................... 455/34.1; 455/54.1; 455/62; 455/63
[58] Field of Search ............ 455/34.1, 33.1, 54.2, 455/62, 63, , 34.2, 54.1, 166.1, 166.2; 379/59, 62

[56] References Cited

U.S. PATENT DOCUMENTS

| | | | |
|---|---|---|---|
| 4,628,152 | 12/1986 | Akerberg | 379/51 |
| 4,771,448 | 9/1988 | Koohgoli | 379/60 |
| 5,025,254 | 6/1991 | Hess | 379/62 |
| 5,034,993 | 7/1991 | Sasuta et al. | 455/34.1 |
| 5,093,924 | 3/1992 | Toshiyuki et al. | 455/62 |

OTHER PUBLICATIONS

CCIR Interim Working Paper, IWP 8/13-54, Jul. 3-12, 1990.

*Primary Examiner*—Reinhard J. Eisenzopf
*Assistant Examiner*—Nguyen Vo
*Attorney, Agent, or Firm*—Foley & Lardner

[57] ABSTRACT

The call set-up technique of this invention is characterized by the use of channel information from both base station and subscriber terminal in determining the radio traffic channel upon which to set-up a new call. Communication between the base station and subscriber terminal is carried out on a signalling channel until the traffic channel is chosen. Calls are set-up so that they proceed on the radio channel which, of a set of channels under consideration by the subscriber terminal, contains the least amount of interference as measured at the subscriber terminal. The set of channels under consideration by the subscriber terminal is a subset of the entire set of channels allocated to the service. This subset is made up of those channels having little interference, as measured by the base station, and which, additionally, are not reserved exclusively for stationary, fixed-allocation services in the geographic location of the base station. The call set-up technique thereby assures that calls proceed on channels containing little interference from the viewpoints of both base station and subscriber terminal. The technique also facilitates sharing of the radio spectrum with stationary, fixed-allocation services because there is no need to program each subscriber terminal to avoid the spectrum allocated to the fixed service.

8 Claims, 6 Drawing Sheets

CALL SET-UP AND SPECTRUM SHARING IN RADIO COMMUNICATION ON SYSTEMS WITH DYNAMIC CHANNEL ALLOCATION

FIELD OF THE INVENTION

This invention relates to radio communication systems which use dynamic channel allocation, especially, but not restricted to, cellular radio systems.

DESCRIPTION OF THE PRIOR ART

A duplex radio link conveying user analogue and/or digital information shall henceforth be referred to as a "call". An example is a telephone call over a wireless channel.

Cellular radio communication systems are able to service a high volume of traffic with a limited amount of radio spectrum by re-using the same radio channels in sufficiently separated cells. In conventional city-wide mobile cellular systems, such as the North American Advanced Mobile Phone System, the frequency allocations for a specific cell are fixed; i.e., each cell can make use of only a specified subset of channels of those allocated to the entire service. The allocations of channels require careful engineering analyses of radio propagation conditions and traffic patterns within and between the cells. Fixed allocation cellular radio systems are engineered so that harmful levels of interference from signals used in neighboring cells are unlikely to be encountered.

Micro-cellular radio systems tend to use dynamic, rather than fixed, channel allocation. With dynamic channel allocation (DCA) each cell can potentially use any traffic channel for a given call of those allocated to the entire service. The decision as to which channel to use is made dynamically, i.e., based on channel usage conditions experienced at the time of call set-up. The decision is also made in a decentralized manner, i.e., by the base station or subscriber terminal in question, without any centralized coordination with other cells. This has the advantages that no detailed engineering analyses are required for each cell site, cell sites can be easily added or moved, and more traffic can be handled than with fixed allocation because channels unused in neighboring cells can be "borrowed".

Examples of radio systems which use DCA are the digital U.K. CT2 system, and some models of analogue North American 46/49 MHz cordless telephones. In present systems incorporating DCA, the determination of which channel a call is to be set-up is made according to channel information from either the base station or the subscriber terminal. The disadvantage with this approach is that appreciable interference may be present on that channel from the viewpoint of the other end of the link. For example, a traffic channel may have little appreciable interference, as monitored by the base station. However, the same traffic channel may have unacceptable interference at the subscriber terminal. Therefore, the presence of interference may reduce the quality of the link and also make it more susceptible to any further channel impairments which might arise.

Also, current DCA techniques makes the effective use of frequency spectrum difficult. Especially, if a system with DCA were to share some common band of the radio spectrum with stationary fixed-allocation services on a national basis. In this instance, there would be potential for the fixed allocation services to suffer from interference. To reliably avoid causing interference, transmitters of the system using DCA, in a given geographic region, would have to be adjusted to avoid using the frequency band that is reserved for the fixed services in that geographic region. For example, in the U.S., the band 944 to 952 MHz is used for fixed services (studio-to-transmitter links). In a given city, only a portion of this band, say, 944 to 948 MHz, might be in use for a studio-to-transmitter link. In another city, another portion, say, 948 to 952 MHz might be in use for such a link. If a cordless telephone system using DCA were to be designed to use the 940 to 952 MHz band and share the 944 to 952 MHz allocation globally with studio-to-transmitter links, then the transceivers used in the first city would have to be adjusted so that the sub-band 944 to 948 MHz could not be used. The transceivers used in the second city would have to be adjusted so that the sub-band 948 to 952 MHz could not be used. Therefore, the adjustments of the numerous subscriber terminals would be expensive and a difficult administrative problem for manufacturers and vendors of equipment. Also, it would make roaming from one geographic region to another with the same subscriber terminal problematic.

There is accordingly a need for a call set-up protocol which allows for the dynamic allocation and selection of traffic channels which are suitable for transmission at the both ends of a transmission link and which lie outside of selected reserved frequencies within a predetermined spectrum.

SUMMARY OF THE INVENTION

Accordingly, it is an object of the present invention to provide a method for performing call set-up in radio systems with DCA, in which a traffic channel is selected according to channel information from both base station and subscriber terminal.

Another object of the present invention to provide a method for performing a call set-up in radio communication system using DCA which allows the sharing of overlapping frequency allocations within reserved frequencies operating in given geographic regions.

The call set-up procedures of this invention require that there be one or more radio signalling channels on frequencies distinct from the radio traffic channels. For either an incoming or outgoing call set-up, the base station selects a number of signalling channels which do not overlap reserved frequencies for this particular geographic region and passes a list of available traffic channels which have low interference from its perspective to the subscriber terminal over a one of the selected channels signalling. The subscriber terminal checks these candidates, chooses one or more traffic channels which have the lowest interference from its perspective, and reports these choices to the base station over a signalling channel. The call then proceeds on a chosen traffic channel.

If certain frequency bands which do not overlap the frequencies of the signalling channels are reserved for stationary fixed-allocation radio services in a given region, then this information need only be programmed into the base station, as part of the list of available traffic channels. The base station would then avoid passing to the subscriber terminal those traffic channels whose frequencies lie within or overlap the reserved band. Thus, subscriber terminals, as well as base stations would never transmit on those frequencies in that geographic region. Similarly, if certain frequency bands reserved for stationary fixed allocation radio services do overlap some frequencies allocated for the signalling channels, then the base station would simply communicate signalling information with the subscriber terminals over signalling channels that do not overlap the reserved services.

Therefore, it is an aspect of the present invention to provide, in a wireless communication system, a method of determining the availability of traffic channels for use between a base station and a subscriber terminal, located in predetermined geographical region, wherein a portion of the radio spectrum within which the wireless communication system operates is reserved for other services, comprising the steps of:

identifying the range of frequencies which is reserved for other services in the base station's geographical region;

selecting, from a plurality of traffic channels covering the radio spectrum, those traffic channels that lie within the reserved range of frequencies for that geographical region; and registering at the base station, a list of traffic channels which are available for service and can be selected as useable traffic channels in the base station's geographical location.

Another aspect of the present invention is to provide a method of selecting a traffic channel for completing a call set-up between a base station and a subscriber terminal located in a predetermined geographical region, wherein a portion of the radio spectrum within which the wireless communication system operates is reserved for other services, comprising the steps of:

identifying the range of frequencies which is reserved for other services in the base station's geographical region;

selecting, from a plurality of traffic channels covering the radio spectrum, those traffic channels that lie within the reserved range of frequencies for that geographical region; and registering at the base station, a list of traffic channels which are available for service and can be selected as useable traffic channels in the base station's geographical location;

selecting, from the traffic channels available for service, traffic channels determined to be useable at the base station;

sending a message, to the subscriber terminal, along a signalling channel linking the base station and the subscriber terminal, the message being indicative of which traffic channels where determined to be useable at the base station;

receiving the message at the subscriber terminal;

selecting, from the message, a traffic channel determined to be useable at the subscriber terminal;

forwarding a response message, to the base station, along the signalling channel, the response message being indicative of which traffic channel was determined to be also useable at the subscriber terminal;

tuning the base station and the subscriber terminal to the selected useable traffic channel; and proceeding with call connection.

A further aspect of the invention is to provide a system for selecting a traffic channel for completing a call set-up between a base station and a subscriber terminal located in a predetermined geographical region, wherein a portion of the radio spectrum within which the wireless communication system operates is reserved for other services, comprising:

means for identifying the range of frequencies which is reserved for other services in the base station's geographical region;

means for selecting, from a plurality of traffic channels covering the radio spectrum, those traffic channels that lie within the reserved range of frequencies for that geographical region; and means for registering at the base station, a list of traffic channels which are available for service and can be selected as useable traffic channels in the base station's geographical location;

means for selecting, from the plurality of traffic channels available for service, traffic channels determined to be useable at the base station;

means for sending a message, to the subscriber terminal, along a signalling channel linking the base station and the subscriber terminal, the message being indicative of which traffic channels where determined to be useable at the base station;

means for receiving the message at the subscriber terminal;

means for selecting, from the message signal, a traffic channel determined to be useable at the subscriber terminal;

means for forwarding a response message, to the base station, along the signalling channel, the response message being indicative of which traffic channel was determined to be useable at the subscriber terminal; and means for tuning the base station and the subscriber terminal to the selected useable traffic channel.

DESCRIPTION OF THE PREFERRED EMBODIMENT

Figure 1:
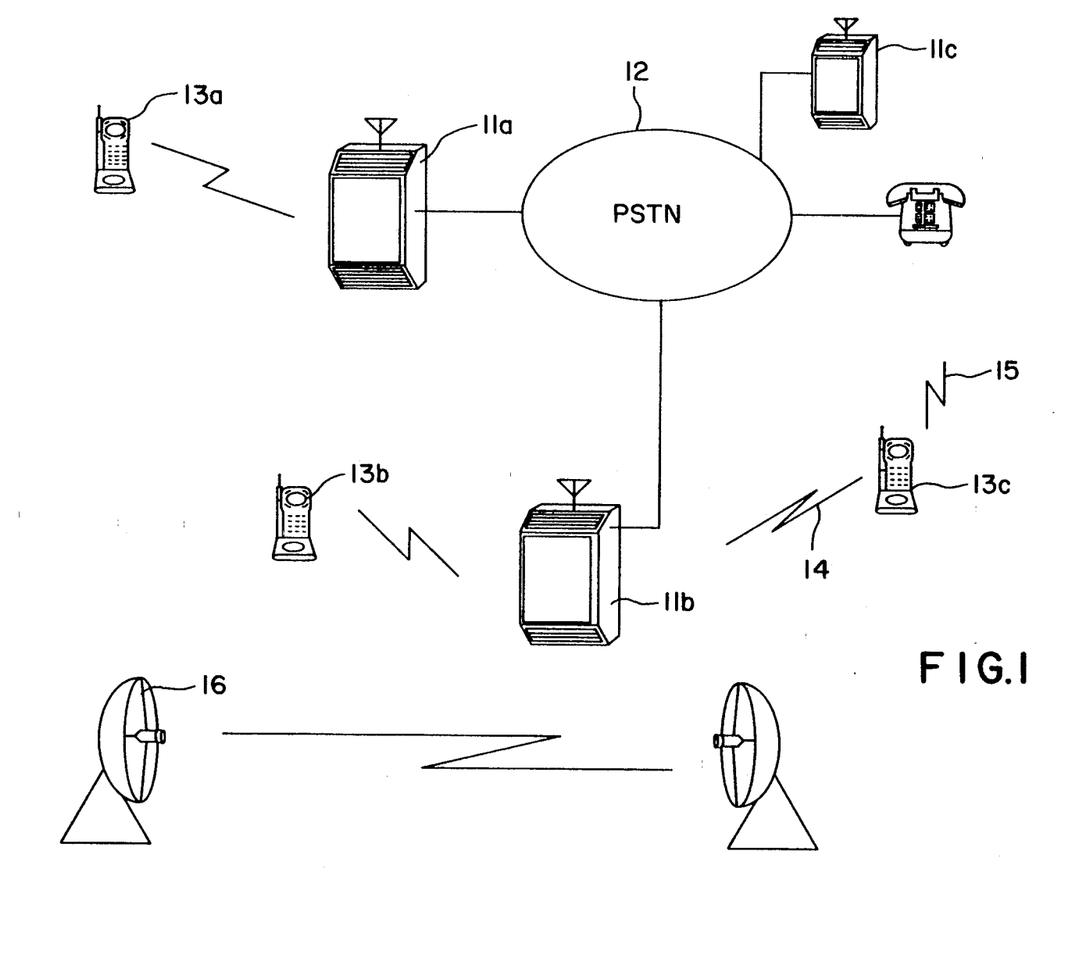
FIG. 1 is an illustration of a radio system embodying the invention, coexisting near a stationary fixed-allocation radio system.

In the illustration of FIG. 1, a low-power wireless communication system is shown. A typical network can consist of small base stations 11a, 11b and 11c, connected to the Public Switched Telephone Network (PSTN) 12. The base stations are basically used as radio transceivers. These can be deployed in offices, residences, and public areas, such as airports, gas stations and shopping malls, etc. The base stations 11a, 11b and 11c, form the interface between a number of subscriber terminals such as portable handsets 13a, 13b and 13c and PSTN 12. Several base stations can also be linked to a host, such as a private branch exchange PBX (not shown) to provide coverage of larger areas in, say, a private business or office building. Such a wireless PBX system is disclosed in U.S. Pat. No. 4,771,448.

It has been demonstrated that since the wireless communication system may be sited close to a stationary radio system 16 which uses a fixed allocation of frequencies, interference may be created if both system operate on the same frequencies. The potential for interference exist even if this fixed-allocation system does not operate with the same modulation type, bandwidth per channel, power level, or antenna type as the wireless communication system. Fixed-allocation systems can for example, consist of a TV studio-to-transmitter link, which must operate free of interference. For example, if base station 11b is located in a geographical area which can affect the operation of a stationary radio system 16, then, base station 11b and subscriber terminals 13b and 13c must be set up to operate outside the frequency range allocated to system 16. This can be achieved by registering with base station 11b, the frequencies of traffic and signalling channels where service with the subscriber terminals cannot be allocated.

Similarly, it has been demonstrated that a radio link 14 between base station 11b and subscriber terminal 13c may be established which, although may be free of interference at the base station 11b, may be affected by interference 15 at the subscriber end of the link, therefore reducing the overall quality of link 14.

With the embodiment of the present invention, the base station 11b would scan all available traffic and signalling channels, i.e. those established to be outside of the frequencies of traffic and signals channels that cannot be allocated, and select traffic channels that are useable or free of interference at the base station's end of the link. A list of frequencies of traffic channels is made and forwarded to subscriber terminal 13c via a scanned signalling channel (not shown) linking the base station and the subscriber terminal. Once received, the list of useable frequencies of traffic channels, is scanned by subscriber terminal 13c. The subscriber terminal can then select traffic channels which are also free of interference at the subscriber end of the link. Once selected, a frequency or traffic channel is chosen to connect the call.

A description of signalling and traffic channel allocation in a low power radio communication system is disclosed in co-pending U.S. application having Ser. No. 568,148, filed on Aug. 16, 1990.

Figure 2:
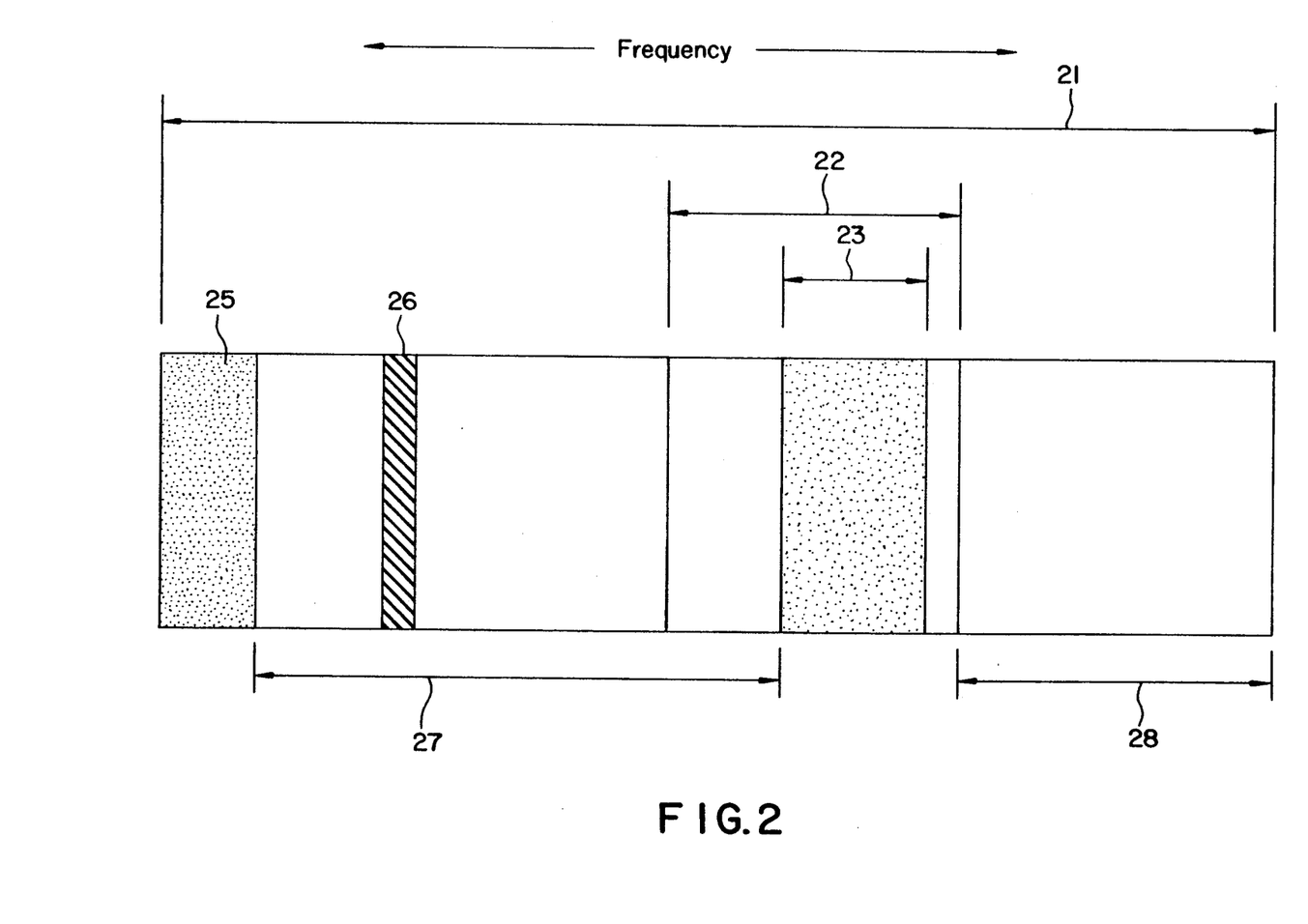
FIG. 2 is an illustration of a frequency plan for a radio system embodying the invention.

FIG. 2 depicts an example of frequency allocation for a wireless communication system. In this example, the larger band 21 represents the band of frequencies allocated for use by wireless communication systems. The smaller band 22 is allocated for stationary fixed-allocation services, such as TV studio-to-transmitter links. The entire larger band 21 can for example, be used by the totality of wireless communication systems in some extended region, say a nation, and the entire smaller band 22 is used by the totality of stationary fixed-allocation services in that region. However, it is possible that in a specific geographic subset of that region, say a city, only a sub-band 23 may be allocated to stationary fixed-allocation services. Thus, all of the larger band 21 except for the sub-band 23 is allowed for wireless communication systems in that city. Therefore, an effective use of the entire band 21 by a wireless communication system can only be done if the available channels within band 21 can be dynamically allocated according to the predetermined spectrum allocation pattern for each geographical region where the system is located. In the example of FIG. 2, only frequency bands 27 and 28 would be available for the allocation of traffic channels in that particular city. Thus, each base station located in the geographical region where this particular frequency allocation pattern exists, would be set-up to operate outside the frequencies or traffic channels included in band 23. In another city, where the frequency allocation pattern may differ, the base stations could be set-up to operate outside a different range of frequencies or traffic channels.

A portion of the available frequencies within band 21, allocated for wireless communication is used for one or more signalling channels 25. The signalling channels are used for the purpose of allowing base stations and subscriber terminals to communicate during call set-up. For example, for sending and receiving signalling information necessary to select a traffic channel 26 to be used for completing the call. A radio link architecture describing the allocation and use of signalling channels is disclosed in a co-pending U.S. application filed Aug. 16, 1990 and having Ser. No. 568,148. The signalling channels are assigned a portion or portions of the allocated band which is never prohibited from use by the wireless communication system. For example, in FIG. 2, the signalling channels could be in any portion or portions of the larger band 21 which do not intersect the smaller band 23.

The signalling and traffic channels of the wireless communication system may be used in time-division duplex mode. That is, base station and subscriber terminal alternately transmit so that their transmissions do not overlap. This technique is commonly referred to as "ping-pong".

The base stations can be configured such that during installation, a particular vendor would register either a range of frequencies within which traffic or signalling channels cannot be allocated or, simply store a list of channels that cannot be allocated for that region. For example, if band 21 comprises a number of channels from, say, 1 to 80, with channels 1-4 used as signalling channels, then, band 23 could as an example, simply be identified as channels 40-46. Therefore, a base station installed in that region would be set-up such that traffic channels can only be allocated between channels 5-39 and 47-80.

Figure 3A:
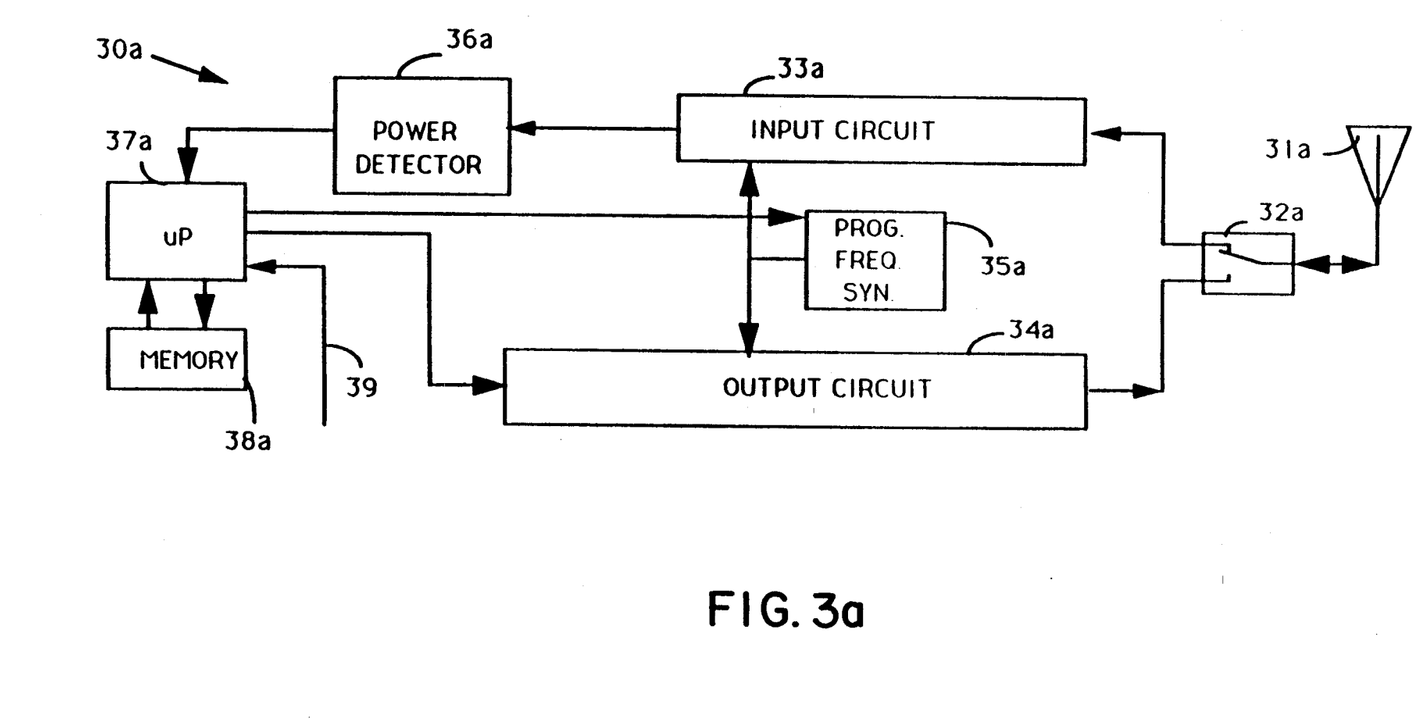
FIGS. 3a and 3b are simplified block diagrams of a base station and a subscriber terminal for use with the present invention.
Figure 3B:
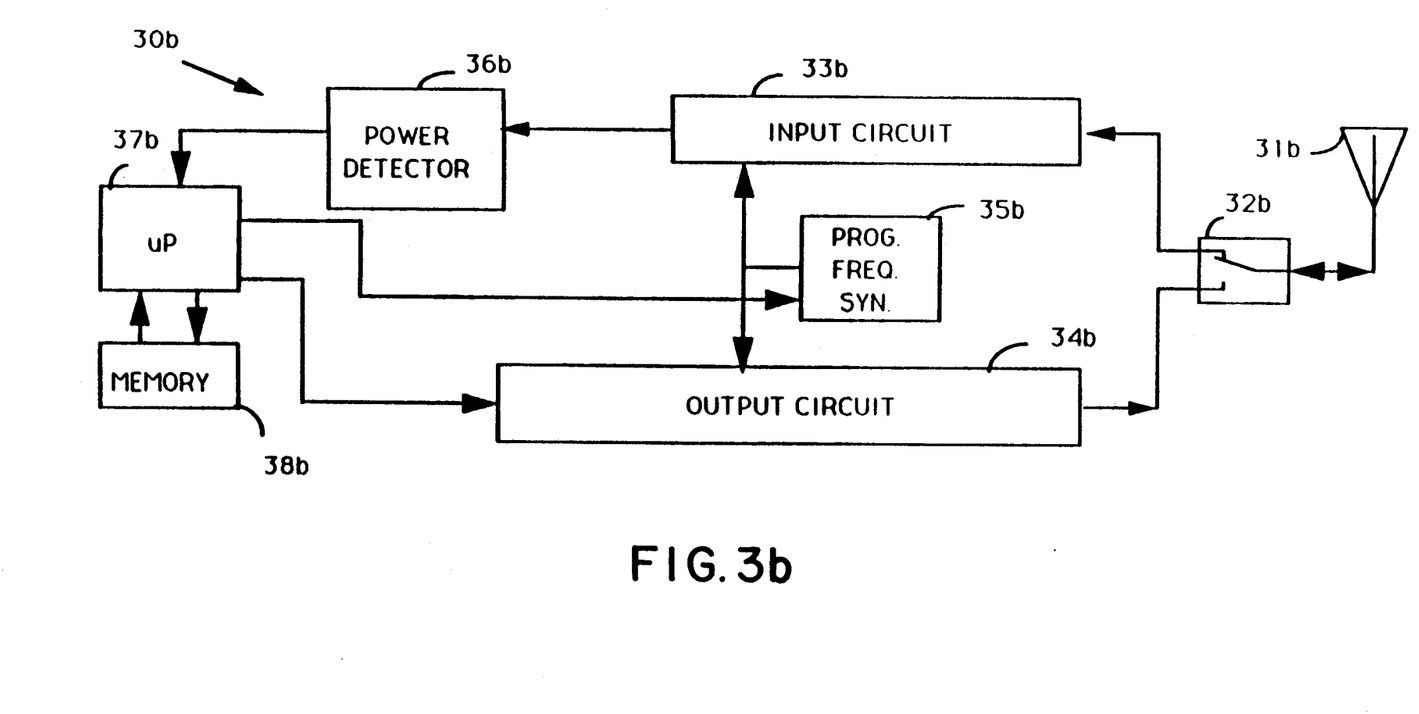

FIGS. 3a and 3b are block diagrams illustrating some the basic components comprised in a base station shown in FIG. 3a and a subscriber terminal shown in FIG. 3b. Except for external programmable input 39, FIGS. 3a and 3b are identical. Two figures were used in order to illustrate the interaction between the base station 30a and subscriber terminal 30b during a typical call set-up procedure.

In each configuration, a receiving and transmitting antenna 31 is connected via a transmit/receive switch 32 to an input circuit 33 and an output circuit 34. A programmable frequency synthesizer 35 is used in conjunction with the input and output circuits to permit selection of any of the available frequency channels. The construction and operation of the switch 32, input circuit 33, output circuit 34 and synthesizer 35 are well known to those knowledgeable in the art, and need not be described further. The power detector circuit 36 is used in the selection of useable traffic and signalling channels. The operations are controlled by a microprocessor 37. Memory 38 is used for storing the list of traffic channels determined to be useable either at the base station 30a or at the subscriber terminal 30b. An external programmable input 39 can be used to register at the base station, those frequencies of traffic and signalling channels which cannot be allocated in view of the possible presence of a stationary radio system 16 (FIG. 1).

Upon installation of the base station 30a, the range of available traffic channels or useable signalling channels can be registered at input 39 and stored in memory 38a. Of course, this operation could also be done at the factory, if the eventual geographical location of the base station is known in advance.

In operation, when a call set-up is attempted between the base station 30a and the subscriber terminal 30b, all available traffic channels are scanned. In the above example, channels 5-39 and 47-80 would each be scanned for the presence of radio power levels above a specified threshold. Scanned traffic channels are selected and processed by means of the programmable frequency synthesizer 35a, in conjunction with the input circuit 33a. The power level of each traffic channel is detected by the power detector circuit 36a. If a scanned traffic channel has a power level below a first predetermined threshold, it is selected as a useable traffic channel and stored in memory 38a. If the scanned traffic channel has a power level above a second predetermined threshold, it is considered unusable. Continuing with the above example, if after having scanned channels 5-39 and 47-50, only channels 53-78 are found to have a power level below the first predetermined threshold, a list of useable traffic channels, i.e. channels 53-78 is stored in memory 38a. The list of useable traffic channels are sent to the subscriber terminal via a signalling channel (not shown) selected on a frequency that does not overlap the reserved frequencies of fixed services.

At the subscriber terminal 30b, each useable traffic channel in the list is selected by synthesizer 35b and scanned by input circuit 33b. The power level of each traffic channel considered useable at the base station is then measured by detector 36b, against a third threshold to determine whether it is also useable at the subscriber terminal. If the power level is below the third threshold, it is selected and stored in memory 38b. Thus, as with the above example, subscriber terminal 30b would scan traffic channels 53-78. If after having scanned these channels, only channels 54-60 are found to have a power level below the third threshold, a list of traffic channels 54-60 is stored in memory 38b of subscriber terminal 30b. Therefore, traffic channels 54-60 are the only channels that are free of any interference at both end of the link, i.e. at base station 30a and subscriber terminal 30b. The base station 30a and the subscriber terminal 30b can then tune to one traffic channel and complete the call connection.

The final selection of one traffic channel to complete the call connection can be done in a number of ways. For example, the selected traffic channel can be the first channel that is found to be below the third threshold level as determined by the subscriber terminal. Upon selection, the subscriber terminal would send a message to the base station indicative of which traffic channel has been selected. Both would then tune to the selected traffic channel. In another approach, a list of traffic channels having power levels below the third threshold would be made up and stored in memory 38b, as described above. The subscriber terminal would then send a message to the base station containing the list of traffic channels. Upon receipt of the list from the subscriber terminal, the base station could select the preferred channel and acknowledge the selection to the subscriber terminal so that both can tune to the selected traffic channel.

Figure 4A:
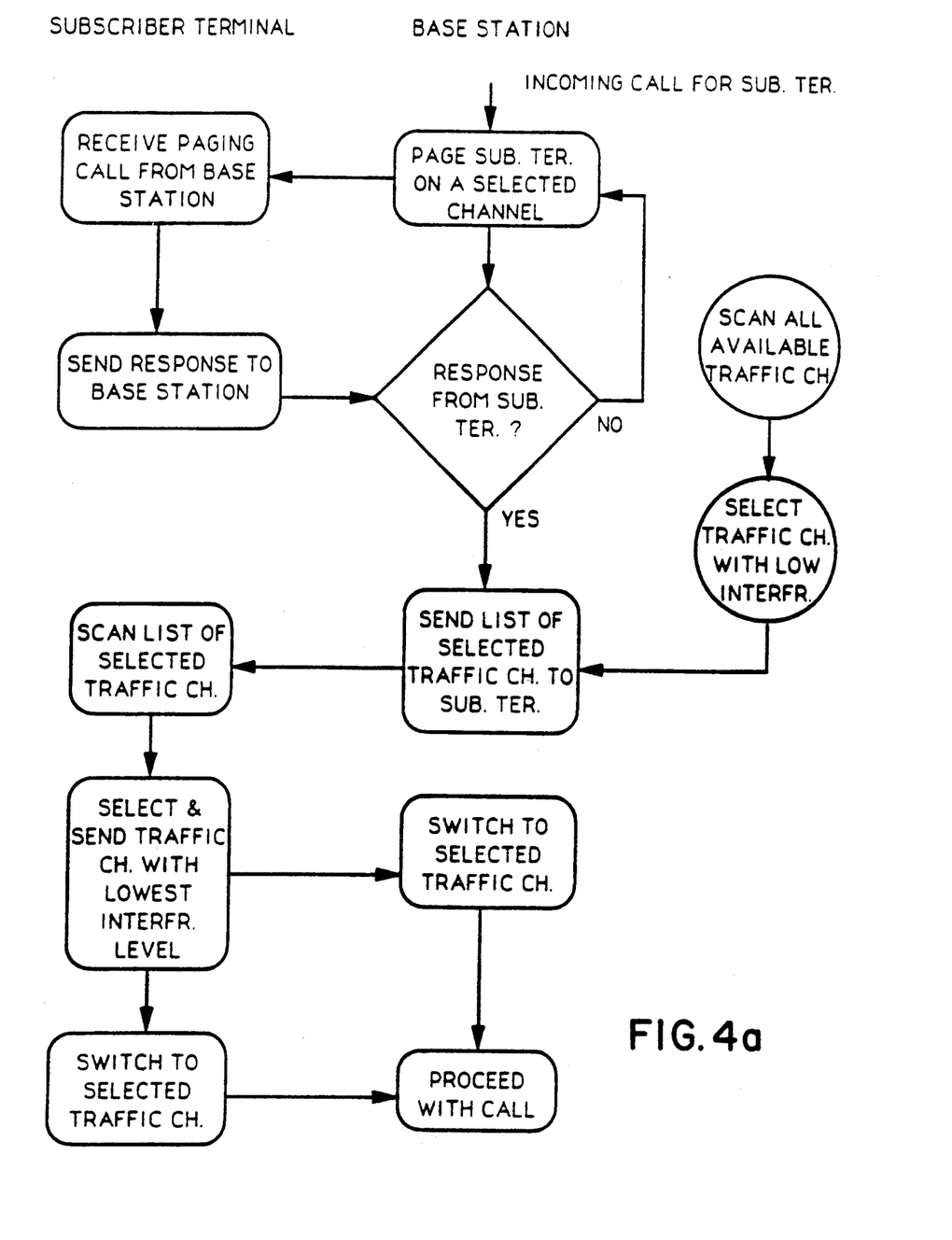
FIGS. 4a and 4b are flow diagrams illustrating the call set-up procedures of the present invention.
Figure 4B:
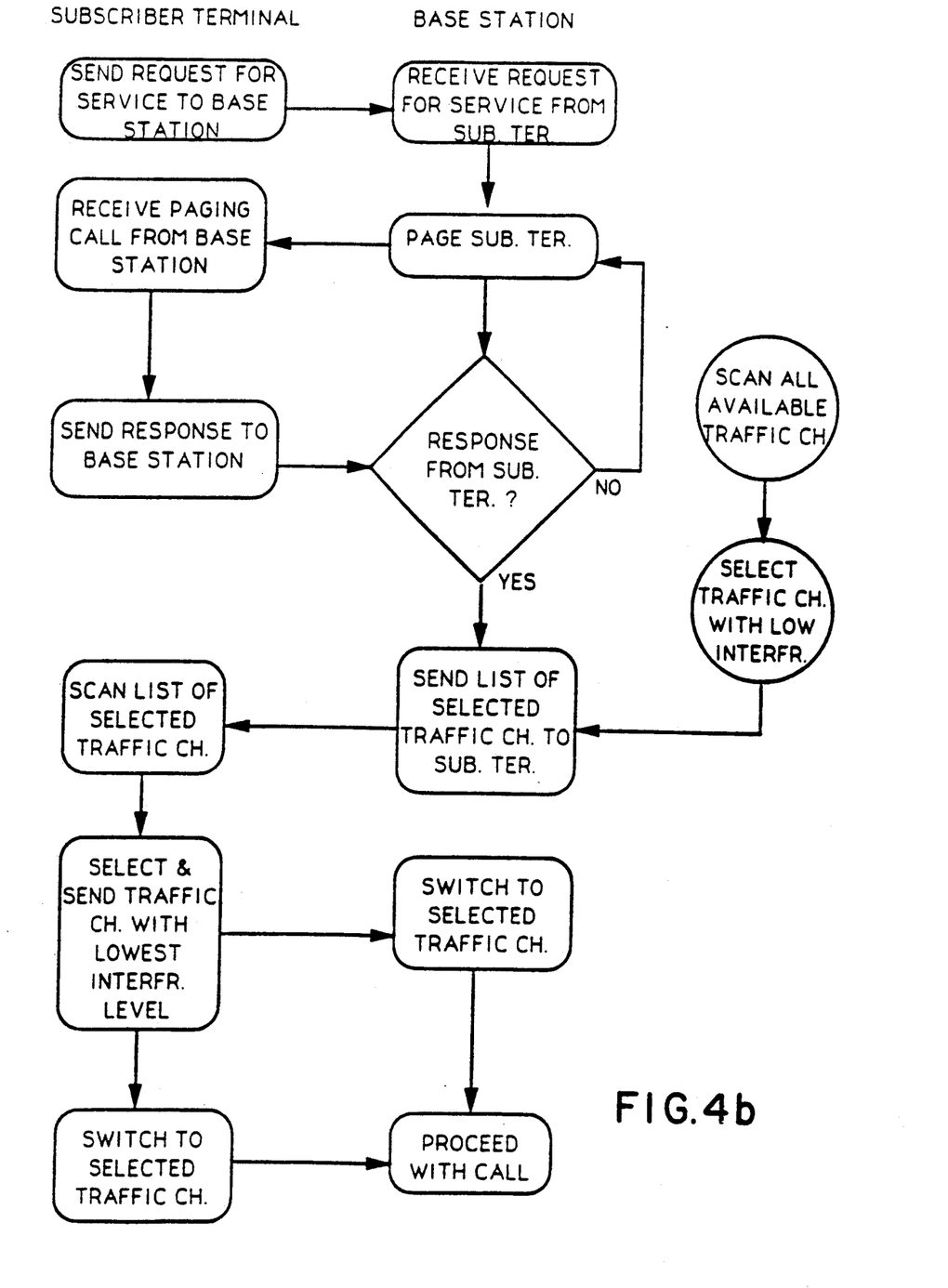

FIGS. 4a and 4b illustrate the flow of information between the base station and a subscriber terminal. In FIG. 4a, the base station receives an incoming call attempt directed to a subscriber terminal. A call set-up initiated by a base station, for example in response to an incoming call from the PSTN to a subscriber registered with that base station, proceeds as follows:

1. The base station pages the subscriber terminal on a signalling channel. The subscriber terminal would normally be monitoring this signalling channel at frequent intervals. The subscriber terminal acknowledges the paging message.

2. The base station then sends the subscriber terminal a list of available traffic channels upon which a call would be acceptable. As indicated above, this list consists of some number of traffic channels of the allocated band for wireless communication systems which:

(a) Are not reserved in the geographic region of the base station for use by fixed-allocation services; and (b) Contain little or no interference power, as measured by the power detector at the base station.

3. The subscriber terminal informs the base station of which traffic channel or channels it prefers of those presented to it in the list. Normally, the subscriber terminal would scan one or more of the traffic channels in the list. Its preferences would be prioritized according to the amount of interference power measured on each. The preferred channel would be the one containing the least interference power as measured by the subscriber terminal. Note that this would not, in general, be the one with the lowest interference power as measured by the base station, hence the need for measurements by the subscriber terminal.

4. Both base station and subscriber terminal would switch their transceivers to the agreed-upon traffic channel, and the call would proceed.

A call set-up initiated by a subscriber terminal, for example to make an outgoing call, proceeds in the same way, except that the subscriber terminal sends a call request on a signalling channel to a nearby base station. The call set-up proceeds from this point identically to the procedure described above for call set-up initiated by a base station, starting from step 1.

In the call set-up procedure described in FIG. 4a and 4b, the knowledge of reservation of certain portions of the spectrum in a given geographic region is assumed to have been programmed into the base stations in that region. The measurement of the interference power present in each of the remaining traffic channels would be carried out by a receiver at the base station on a frequent basis. The receiver which carries out the scan could be, but need not be, the same receiver which communicates with the subscriber terminal.

We claim:

1. In a radio communication system operating within a specific radio spectrum and having a number of base stations, each communicating with a plurality of subscriber terminals over separate radio channels, a method of determining the availability of radio channels for use between said base station and said subscriber terminals, said base stations being located in geographical regions wherein varying portions of the radio spectrum in each of said geographical regions are reserved for fixed radio transmission services, the method comprising the steps of:

identifying the range of frequencies which is reserved for said fixed radio transmission services in a said base station's geographical region;

selecting, from a plurality of radio channels covering the radio spectrum, those radio channels that lie outside of the reserved range of frequencies for said base station's geographical region; and registering, at the said base station associated with the geographical region, signalling and radio traffic channels that can be allocated from those channels that lie outside the reserved range of frequencies.

2. A method as defined in claim 1, wherein said radio channels are registered by:
    storing at the base station, a list of available radio channels comprised of traffic and signalling channels which can be allocated in the geographical region where the said base station is located.

3. In a radio communication system operating within a specified radio spectrum and having a number of base stations, each communicating with a plurality of subscriber terminals over separate radio channels and each base station having access to each of said plurality of radio channels, a method of selecting a radio traffic channel for completing call set-up of incoming and outgoing calls between a base station, a subscriber terminal and the Public Switched Telephone Network (PSTN), said base stations being located in geographical regions wherein varying portions of the radio spectrum in each of said geographical regions are reserved for fixed radio transmission services, the method comprising the steps of:
    identifying the range of frequencies which is reserved for said fixed radio transmission services in a said base station's geographical region;
    selecting for allocation, from a plurality of radio channels covering the radio spectrum, those radio channels that lie outside of the reserved range of frequencies for said base station's geographical region;
    registering, at each of said base stations, signalling and radio traffic channels that can be allocated;
    receiving at a said base station, an incoming call attempt from a subscriber or from the PSTN;
    scanning, at the said base station, said radio traffic channels that can be allocated at the said base station for the presence of radio power levels above a first specified threshold;
    measuring the power level of a scanned traffic channel;
    selecting from the scanned traffic channels, traffic channels with radio power levels below said first specified threshold;
    storing a list of selected traffic channels;
    sending, to the subscriber terminals, the list stored at said base station;
    receiving the list of selected channels at the subscriber terminal;
    scanning at the subscriber terminal the traffic channels on said list for the presence of radio power levels above a second specified threshold;
    measuring at the subscriber terminal the power level on a scanned traffic channel on said list;
    selecting at the subscriber terminal from the scanned traffic channels of the list, traffic channels with radio power levels below said second specified threshold;
    storing the selected traffic channels at said subscriber terminal;
    sending, to the said base station, along the signalling channel, a traffic channel selection comprised of a first preferred traffic channel and a second redundant traffic channel;
    receiving the traffic channel selection at the said base station;
    switching the said base station and the subscriber terminal to the preferred traffic channel; and
    proceeding with call connection.

4. A method as defined in claim 3, wherein said plurality of traffic channels are scanned by switching the said base station on an available frequency channel using frequency synthesizer means.

5. A method as defined in claim 4, wherein said traffic channels are scanned regularly to maintain a list of useable traffic channels.

6. A method as defined in claim 3, wherein said radio traffic channels that can be allocated are registered by:
    storing at the said base station the allocatable radio traffic channels.

7. A method as defined in claim 3, further comprising the step of selecting radio signalling channels whose frequencies lie outside of the reserved range of frequencies for the said base station's geographical region.

8. A method as defined in claim 7, further comprising the step of storing at the said base station a list of the selected signalling channels.

* * * * *